# 3,103,466
TOPICAL MEDICAMENT INCLUDING POLYURONIDE DERIVED FROM ALOE
Alexander Farkas, 425 NE. 173rd St., Miami, Fla.
No Drawing. Filed Dec. 20, 1956, Ser. No. 629,460
4 Claims. (Cl. 167—58)

This invention relates to a topical medicament, particularly useful in the treatment of open wounds and burns, comprising, as the essential medicating component, polyuronide solids or concentrates and non-toxic salts thereof, purified to be substantially free of other plant substances naturally occurring therewith, useful in concentrations of 0.2 to about 10 weight percent in a carrier; to methods of forming the composition; and to curing of wounds and various types of burns by topical application thereto of the medicating composition.

The polyuronide of this invention is a complex naturally occurring polysaccharide having chemically bonded thereto one or more hexuronic acid radicals and non-toxic salts thereof. The polyuronide or salt may be designated by the following formula:

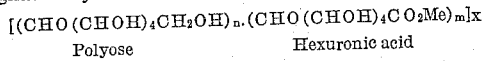

wherein the polyose radical is selected from the group consisting of glucose, and mannose; the hexuronic acid radical is selected from the group consisting of glucuronic acid, mannuronic acid and galacturonic acid; $n$ is an integer variable between one and about one hundred; $m$ is an integer of the same range from one to about one hundred; Me is a member of the group consisting of non-toxic metals such as calcium, magnesium, sodium, potassium, barium, zinc, bismuth, and the like, naturally occurring as mixtures thereof, and X may range from one to one hundred or more. While Me cations are shown bonded to carboxyl as a typical salt, they may be held by other secondary valence bonds in the molecule as a complex.

Thus the polyuronide may be a single complex molecule according to this formula or a polymer thereof. The compounds in the simplest monomeric form may have a molecular weight as low as 374, but as more usually occurring in nature, are higher polymers thereof, wherein molecular weight may range up to about 275,000.

The medicating composition comprising the polyuronide compound dissolved or suspended in the range of about .2 to 10% by weight in a carrier of liquid to gelatinous consistency, preferably an aqueous carrier, is found to have remarkable curative properties for open wounds, and especially burns. It appears to rapidly detoxify the damaged surface area while supplying an anesthetic and/or analgesic effect, to quickly reduce pain while promoting granulation of the surface skin.

For these several functions, while the composition, as compounded in an inert carrier, has no apparent biocidal effect upon micro-organisms, the rapid curing effect makes it useful in treatment of other surface wounds invaded by micro-organisms including other types of dermatitis; and for such purpose the present composition may be used as a carrier for other useful medicating additives such as known biocidal substances specific for the medication of the particular micro-organisms.

The topical composition, comprising the polyuronides distributed in an inert carrier, is distinguished from polyuronides as they naturally occur in various plant substances both in substance as well as in its critically improved curative effect. For instance, various natural gels which may contain trace quantities of polyuronides associated with other plant substances, such as other polysaccharides, have substantially no curative effect; in fact, the raw material containing trace quantities, in which the polyuronides naturally occur, usually irritates and promotes infection in the wound or burn. The polyuronide after purification and compounding in the specific quantity range forms a composition which is then quite active. The composition appears to decrease in activity as the concentration of polyuronide in the carrier is raised, whereby if the quantity of polyuronides in the carrier is increased substantially above the 10% limit given, the beneficial effect is markedly reduced. On the other hand, even though the present composition, as stated, is quite active in low concentrations, where the polyuronide contains substantial amounts of other natural plant substances, such as other polysaccharides, terpenes, resinoids, phenols, organic acids and other naturally occurring plant substances, and especially enzymes which have a hydrolytic decomposing effect upon the saccharides, including the polyuronides, any beneficial effect that might have been present by such polyuronide is destroyed. In fact, my experiments have shown that natural occurring plant substances, in various degrees of concentration, do have a slight initial beneficial effect upon a burn, but almost immediately after a short period of application the injured area becomes irritated and infectious, and the natural composition inflicts more damage than good.

Accordingly, the composition of this invention is distinguished by its content of polyuronide substantially free from other natural plant substances, and used as a suspension in an inert carrier in active proportions of .2 to 10% weight. The composition exhibits greatest curative activity in the range of 1 to 5%, which of course is preferred.

While the compound operates most actively in an aqueous carrier, other types of carriers, liquid or gelatinous may be used. Typically useful are water, or aqueous solutions of lower alcohols such ethanol, ethylene glycol, propylene glycerol, sorbitol and the like, with or without gelling agents, such as carbowax (polyethylene glycol), carboxy methyl cellulose, methylcellulose; as well as inert organic type carriers such as lanolin, petrolatum, mineral oils, and emulsions of water-in-oil using organic liquid of these types as the continuous phase, or oil-in-water type emulsions. Other desirable additives for producing a soothing, readily applied emollient, are the hydrous oxides such as hydrous alumina, clay (bentonite), talc and other liquid or gel modifying filler and excipient type substances. It is sometimes useful to include .001 to 1% of a wetting agent, preferably a non-ionic Triton type such as Triton A–20, or applying as a spray or mist it is sometimes desirable to package the composition with a propellent gas such as Freon in pressure resistant containers.

The purified polyuronide, variable with the plant source, usually contains substantial quantities of naturally occurring polyuronide salts, substantially calcium, and with lesser quantities, often only traces, of magnesium, potassium, sodium or manganese salts. It will normally dissolve in water as the carrier medium to a pH corresponding to the optimum natural pH of the skin, in the range of 5 to 6, usually about 5.4 to 5.7.

Where the composition is to be applied to wounds which are desirably further disinfected, the composition may further have added specific biocidal substances, for instance antibiotics, such as penicillin, tetracyclene, oxytetracyclene, or typically useful fungicidal additives such as hexachlorophene. The composition may further contain other desirable medicating substances for their known specific functions. For instance, amino and nucleic acids may be added to my composition to counteract protein losses in severe burns.

The polyuronides occur widely in various plant substances, such as in the natural plant juices, aqueous extracts, and other plant exudates like gums, mucilages and resins, and these can be useful sources of raw materials from which the polyuronides may be obtained. I prefer the various aloes of the order Liliaceae such as *Aloe barbadensis, A. perryi, A. ferox, A. vera, A. succotrina, A. vulgaris, A. chinensis,* and the like as my source material because of the relatively greater abundance in which the polyuronide occurs therein. Such natural or commercial products may contain up to 50 or more different plant substances variable with the plant source in which the polyuronides may be present in extremely minute quantities. For instance, in the aloes plants the plant mucilage or gel from the leaves may comprise 99.2% of water or volatile components or liquid components such as water, and the residue, 0.8%, a complex mixture of more than 50 of these many other plant components, of which the polyuronide content may be 5 to 40%.

For separation of the polyuronides, the plant juice, or a concentrated gelatinous residue thereof, is treated to precipitate the polyuronides, selectively, by adding the generally water soluble suspension or solution of the finely powdered gum, or other naturally or commercially available form thereof, preferably as a concentrate in which as much of the water content thereof as practical may be first removed, to a precipitating liquid in which the polyuronide is insoluble and in which other plant components may be dissolved. Sometimes, where the composition contains substantial proportions of water insoluble fats or fat soluble components such as terpenes, resins, steroids, and the like, the raw material may be first extracted with a fat solvent, such as petroleum ether, hexane, sulphuric ether, and the like. Where substantial quantities of tannins are also found to be present, these too may be first removed by extraction with volatile water, immiscible solvents, preferably of a polar type, for instance, the lower aliphatic esters of water insoluble alcohols such as ethyl through amyl acetate, or higher volatile aliphatic alcohols having low water solubility, such as the amyll through decyl alcohols. After such pre-purification the water soluble raw material is then mixed with a precipitation liquid in which only the polyuronide is insoluble. That precipitation not only will remove other contaminating water soluble components which remain dissolved in the aqueous medium in which the raw material is dissolved, but will also remove substantial quantities of water from the polyuronide. The polyuronide precipitates first as an extremely concentrated substance, coagulating as an albumen-like fibrous precipitate, with portions adhering to the bottom and sides of the precipitating vessel, some portions adhering to the agitators of the equipment used in the mixing with the precipitating liquid, and some portions remain suspended as a discontinuous gelatinous or flocculent suspension in the liquid medium, and which settles after a short period of standing in the quiescent state.

Typically useful organic solvents for precipitation are, ethyl alcohol or acetone. Diethyl ether is a useful polyuronide precipitant, but its use is limited to mixtures, up to about 50%, with such solvents as acetone and ethanol. Since with or without the addition of water soluble, non-toxic acids the polyuronide does not dissolve in ether, the ether may also be used as a final washing agent to remove the alcohol or acetone medium with which the precipitated polyuronide is finally wet after precipitation.

The following examples illustrate the practice of this invention:

*Example I.*—2500 cc. of natural *Aloe vera* gel, containing about 0.9% of solids, substantially polysaccharides, is concentrated in a vacuum to about 1000 cc. The concentrate at room temperature of about 70 deg. F. is slowly poured in a thin stream into 5000 cc. of 95% ethanol while rapidly stirring. The polyuronide forms as a coagulated albumen-like fibrous precipitate, some portions floating, other portions adhering to the bottom of the flask with a large portion adhering to the stirrer. The suspension is allowed to settle for 10 minutes and the clear solution of alcohol and water extracted from the precipitate with dissolved substances separated from the polyuronide, is decanted. The precipitate is reimmersed in fresh alcohol and again stirred to effect a washing, allowed to settle, and the washing alcohol decanted. The precipitate is finally washed with ether to remove the traces of alcohol, and the ether is removed in vacuo. The vacuum treatment may be continued to form a dry solid of the precipitate. The solid is then ground to a powder; 12.7 grams of dry solid are obtained. Analysis of the dilute acid hydrolyzate showed the empirical formula to be $(C_6H_8O_6)_x$ containing 2.4% of uronic acid anhydride, the hydrolysate consisting of substantially equal quantities of mannose and glucose, each present in proportion of 48.8%.

*Example II.*—The procedure of Example I was repeated, using as precipitating medium both ethyl alcohol and diethyl ether in ratio of four parts of alcohol to one of ether. The yield and quality of the polyuronide was the same, except that the time to convert to a dry solid was substantially shorter.

*Example III.*—1000 cc. of *Aloe vera* gel concentrate of Example I is slowly poured into 3000 cc. of acetone with continuous stirring, the polyuronide is precipitated, mechanically adhering itself to the stirrer with a small settled portion in the bottom of the flask, both being freed of solvent by decanting. The precipitate is washed once with diethyl ether, and the ether is removed in vacuo.

*Example IV.*—6 lbs. of flash dried fresh mangrove leaf meal is extracted in a Soxhlet extractor for 6 hours with 3½ litres of hexane, the extract liquid removed and the wet meal further extracted with 3½ litres of ethyl acetate for 8 hours. The wet meal is then soaked in 24 litres of hot water for 24 hours. The residual meal is filtered off and the aqueous extract solution concentrate in vacuo to 4 litres and the concentrated solution then poured in a thin stream in 16 litres of 95% ethanol with continuous agitation. A polyuronide precipitate forms as in previous examples and separated from the suspending liquid by decantation, washed once with 95% ethanol, then with sulphuric ether, and finally dried. The product contains less than 0.1% of impurities which may be further reduced by re-dissolving in water and again precipitated.

*Example V.*—100 cc. sterile distilled water has dissolved therein 2 grams of dry powdered substantially pure polyuronide as formed in Example I. The solution is lightly opalescent, slightly more viscous than water, to comprise a readily flowable or sprayable lotion type liquid. If contains an unanalyzably small trace quantity of a component which upon substantial oxidation by the air will develop a faint pink to red coloration. Generally, that color does not develop when air bubbles are removed and it is stored in air free containers. However, that coloring component has no detectable effect upon the valuable curative properties of the composition. It will be understood, accordingly, in the reference herein to "substantially pure," such trace quantity of associated coloring components may not be excluded.

*Example VI.*—The increasing viscosity and stiffness of a gel formed by increasing the quantity of polyuronides is illustrated in the present example. To 100 cc. of sterile distilled water is added 5 grams of the polyuronide of Example I, with agitation in a Waring Blendor. The composition sets of a solid, but thixotropic gel, which becomes fluid with agitation, and may be just poured as it flows from a container very slowly. In contrast, the addition of 6 to 10 grams of polyuronide to the same quantity of water produces gel of increasing viscosity which will not flow but may be mechanically spread with some pressure.

*Example VII.*—100 cc. of pure sterile distilled water has added thereto 1.5 grams of polyuronide of Example I, 0.005 gram of 8-hydroxy quinoline sulphate, 0.15 gram of Tween-20 and 0.15 g. of Span-40, and about one drop of an anti-foaming agent, polyethyleneoxide, the product worked in a Waring Blendor to a homogeneous opalescent lotion comprising a readily flowable gel. The final blend is placed in a vacuum chamber for about 10 minutes to remove dissolved or suspended gas bubbles.

*Example VIII.*—3 grams of polyuronides produced as in Example I is dissolved in 100 cc. of sterile distilled water as in Example V. The lotion produced has added thereto 0.3 gram of Triton-A20 and is poured in a thin stream into 200 cc. of a light medicinal grade white mineral oil while continuously agitating to form a suspension of the gelatinous lotion in the mineral oil.

*Example IX.*—The lotion as produced in Example V has slowly added thereto, with continuous agitation, 20 grams of molten lanolin to form a well distributed oil-in-water suspension of lanolin in the gel.

*Example X.*—To 100 cc. of sterile distilled water is added 1 gram of the polyuronide of Example IV, 1 gram of carbowax, and sufficient (about .3 g.) sodium diacid phosphate to adjust pH to 5.5

*Example XI.*—To the fluid gel of Example V is further added 5 grams of dry powdered sterile bentonite and homogeneously blended therein.

*Example XII.*—To the gel of Example V is further added sufficient penicillin-G to form a concentration of 200,000 units per cc. of gel, 0.008 gram of 8-hydroxy quinoline sulphate.

A 5% aqueous solution of polyuronide when spread over a wound, or abrasion, will dry in a few minutes, to form a pliable, transparent and almost invisible film coating. It is an excellent protective wound dressing which further promotes granulation of the tissue and protects the wound from infection. It has the advantage that it is soluble in water and is easy to wash off when desired. While such film coating is useful alone, and desirably applied as such, it is compatible with and useful in combination with other film forming substances, such as methyl cellulose, carboxymethyl cellose, and the like.

Each of the compositions as produced in Examples V through XII give remarkable fast pain relief and promote curing of both wounds and burns. The addition of antibiotics and fungicides is generally used only where specifically indicated by the particular skin damage if it is infectious and only substantially invaded either by bacteria or fungi. Ordinary burns, coated with the ointment of this invention, do not become infected, in substantial contrast to other commercial ointments for topical use.

While various carriers are described, the composition is most effective in an aqueous carrier in which it may be adjusted to various viscosities, from liquid through flowable gels, including higher consistencies requiring some slight pressure to spread, such as pastes. The more fluid solutions, such as in Example V, may be applied by pouring over the damaged skin area; by moistening a dressing for the wound or burn with the liquid or gel, before applying thereto; and by spraying through an atomizer or nebulizer. The polyuronide is entirely non-toxic and non-irritating, as well as compatible with body fluids generally, not excluding those appearing as exudates from a damaged skin area. For this purpose it is found that the fluid lotion may be nebulized into fine droplets, as an aerosol, and inhaled.

The product, while quickly relieving pain, particularly from burns, appears thereby to have an analgesic and anesthetic effect; particularly in the type of healing rapidly promoted by the composition, it appears to have a detoxifying effect which may be the result of the reducing action inherent in the polyuronide without causing irritation, because burns, even second and third degree burns, become healed unusually rapidly, and the skin re-forms with rapid granulating, without scab formation.

Certain modifications will occur to those skilled in the art, and accordingly, it is intended that the examples presented above be regarded as illustrative of the invention, and not limiting the same, except as defined in the claims appended thereto.

I claim:

1. A topical medicament comprising a gel variable in consistency from a flowable gelatinous liquid to a deformable solid, said gel consisting essentially of an aqueous carrier medium gelated with 1 to 5% by weight of a non-toxic salt of a species of purified naturally occurring polyuronide derived from aloe, said polyuronide being purified by freeing it from substantially all naturally occurring plant substances other than the naturally occurring polyuronide salts therein, said polyuronide of aloe consisting of a species of a hexuronic acid within the approximate structure:

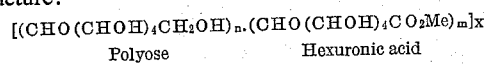

Polyose      Hexuronic acid wherein the hexuronic acid is a member of the group consisting of galacturonic, mannuronic and glucuronic acids, the polyose radical is a glycosidal radical of the group consisting of glucose and mannose, Me is a metallic cation, $n$ and $m$ are integers from 1 to about 100 and X is an integer selected to impart a molecular weight to the polyuronide structure in the range of from about 374 to 275,000.

2. The topical medicament as defined in claim 1 wherein the salt cation is substantially calcium.

3. The method of curatively medicating surface wounds and burns, comprising topically applying to the injured surface a medicating composition comprising an aqueous carrier medium, containing from about 0.2 to 10% by weight as the sole saccharous component therein, a mixture of substantially pure polyuronide salts of a hexuronic acid, said salts being polyuronides derived from aloe and purified by being substantially freed of all naturally occurring plant substances other than the naturally occurring polyuronide salts therein and having the approximate structure:

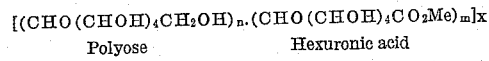

Polyose      Hexuronic acid wherein the hexuronic acid is a member of the group consisting of galacturonic, mannuronic and glucuronic acids, the polyose radical is a glycosidal radical of the group consisting of glucose and mannose, Me is a metallic cation, $n$ and $m$ are integers from 1 to about 100 and X is an integer selected to impart a molecular weight to the polyuronide structure in the range of from about 374 to 275,000.

4. The method of curatively medicating damaged tissue comprising applying thereto substantially pure dry powdered gel of aloe, said gel being freed of substantially all plant substances occurring therewith other than the naturally occurring polyuronide salts therein, said aloe gel consisting of a species of a hexuronic within the approximate structure:

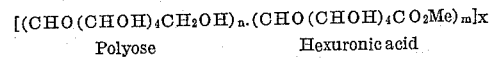

Polyose      Hexuronic acid wherein the hexuronic acid is a member of the group consisting of galacturonic, mannuronic and glucuronic acids, the polyose radical is a glycosidal radical of the group consisting of glucose and mannose, Me is a metallic cation, $n$ and $m$ are integers from 1 to about 100 and X is an integer selected to impart a molecular weight to the polyuronide structure in the range of from about 374 to 275,000.

References Cited in the file of this patent

UNITED STATES PATENTS

| | | |
|---|---|---|
| 1,167,230 | Tambach | Jan. 4, 1916 |
| 2,376,656 | Buchanan | May 22, 1945 |

(Other references on following page)

OTHER REFERENCES

Wright: J.A.M.A., vol. 106, No. 16, April 18, 1936, pp. 1363–1364.

Rowe et al.: J.A.M.A., Sci. Ed., October 1941, pp. 266–269.

Osol-Farrar: U.S. Dispensatory, 24th Ed., J. B. Lippincott Co., Phila., Pa., 1957, pp. 42–46, esp. p. 46.

Roboz et al.: J. American Chemical Society, vol. 70, September-December 1948, pp. 3248–3249.

Pigman et al.: Advances in Carbohydrate Chemistry, vol. 4, Academic Press Inc., Publ., N.Y. (1949), pp. 243–246 and 270.

Merck Manual, Merck & Co. Inc., Rahway, N.J. (1950), pp. 1107–1114, esp. at 1109.

Science, vol. 115, No. 2976, Jan. 11, 1952, pp. 40–41.

Hudson et al.: Advances in Carbohydrate Chem., vol. 7, Academic Press, N.Y. (1952), pp. 313–322.

Whistler: Polysaccharide Chemistry, Academic Press, Inc., Publ., N.Y. (1953), pg. 17.

Becker: Am. Prof. Pharmacist, 20:10, pp. 939–949, October 1954.

Swintosky et al.: (I) J.A.P.A., Sci. Ed., vol. 44, No. 2, February 1955, pp. 109–112.

Swintosky et al.: (III) J.A.P.A., Sci. Ed., vol. 44, No. 9, September 1955, pp. 540–542.

Allen: J.A.M.A., July 21, 1956, vol. 161, No. 12, pg. 1191.